No. 730,880. PATENTED JUNE 16, 1903.
W. J. COOK.
LOCKING WASHER.
APPLICATION FILED JUNE 30, 1902. RENEWED APR. 21, 1903.

NO MODEL.

Witnesses:
R. C. Orwig.
J. M. Starkey

Inventor W. J. Cook
by Orwig & Lane Attys.

THE NORRIS PETERS CO., PHOTO-LITHO., WASHINGTON, D. C.

No. 730,880. Patented June 16, 1903.

UNITED STATES PATENT OFFICE.

WILLARD J. COOK, OF DEXTER, IOWA.

LOCKING-WASHER.

SPECIFICATION forming part of Letters Patent No. 730,880, dated June 16, 1903.

Application filed June 30, 1902. Renewed April 21, 1903. Serial No. 153,664. (No model.)

*To all whom it may concern:*

Be it known that I, WILLARD J. COOK, a citizen of the United States, residing at Dexter, in the county of Marion and State of Iowa, have invented certain new and useful Improvements in Locking-Washers, of which the following is a specification.

The object of my invention is to provide a locking-washer of simple, durable, and inexpensive construction susceptible of use in connection with any bolt and nut and designed to securely lock the nut to the bolt so that it cannot be loosened by any of the shakes and jars to which the nut may be ordinarily subjected, but which will permit the removal of the nut when a wrench is applied thereto.

More specifically, it is my object to lock the nut to the bolt by clamping the tapered end of the nut-thread against the adjacent threads of the bolt, it being understood in this connection that there is always a slight space between the threads of the bolt and nut, and I clamp the nut to the bolt by bending and distorting the tapered end of the thread on the nut, so that it will firmly bind against the thread on the bolt; and my object is further to hold the nut in its locked position by spring-pressure, so that even if the nut should be partly unscrewed from the bolt it would still be held from further rotation on the bolt.

My invention consists is certain details of the construction, arrangement, and combination of the various parts of the locking-washer whereby the objects contemplated are attained, as hereinafter more fully set forth, pointed out in my claims, and illustrated in the accompanying drawings, in which—

Figure 1:
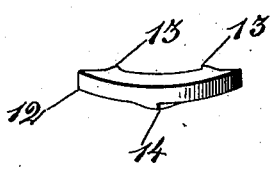
Figure 2:
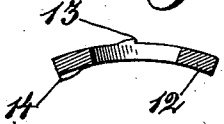
Figure 3:
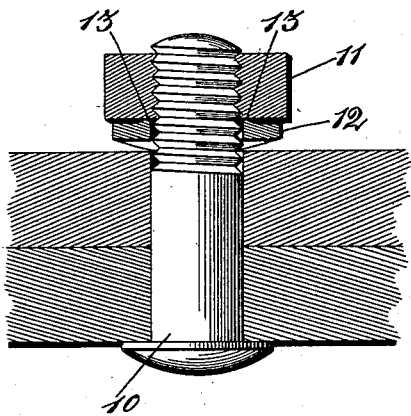
Figure 4:
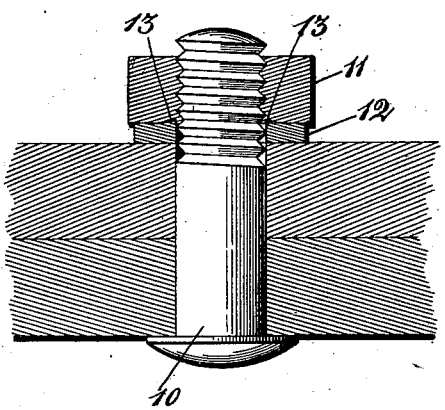

Figure 1 shows a side elevation of the complete locking-washer. Fig. 2 shows a vertical central sectional view of same. Fig. 3 shows a vertical sectional view of two objects, a bolt passed through them, and a nut and my improved locking-washer on the bolt, the nut and washer being shown in sections and the washer being shown in its normal position before the nut is screwed tightly against it. Fig. 4 shows a like view with the nut in its locked position and the locking-washer flattened out.

Referring to the accompanying drawings, I have used the reference-numeral 10 to indicate an ordinary screw-threaded bolt, and 11 an ordinary nut to receive the bolt.

The locking-washer is disk-shaped and provided with a smooth central opening large enough to admit the bolt, and, as clearly illustrated in Fig. 2 of the drawings, the washer is shaped in the form of a segment. This washer is made of spring metal, and obviously when it is flattened out it will have sufficient resiliency to again resume its segmental shape when the pressure on it is removed. The washer proper is indicated by the reference-numeral 12. On the highest points of the top surface of the washer, at diametrically opposite sides, I have provided two integral pointed projections 13. The inner ends of these projections are flush with the inner face of the central opening through the washer. One of the side edges of each projection is inclined and the other side edge is vertical, and the top surface of each projection tapers outwardly until it meets the top surface of the washer at a point only a slight distance from the center opening through the washer, and from the under surface of the washer at points diametrically opposite each other and on the lowermost parts of this under surface are the ratchet-teeth 14.

In practical use the washer is first placed upon the bolt with its lower surface so adjusted that the ratchet-teeth 14 thereon rest against the object through which the bolt is passed. Then the nut is screwed to the bolt, and as soon as it engages the washer the projections 13 on its top surface will strike the thin tapering end of the thread on the nut, and as the nut is further turned and screwed tightly upon the bolt the washer is flattened and the teeth 14 are firmly driven into the object through which the bolt is passed, and one of the projections 13 will then engage the thin tapered end of the screw-thread of the nut and will distort it and force it into engagement with the thread on the bolt. Obviously this result could not be produced by the ratchet-teeth on the top surface of the washer of the teeth extended from the center to the circumference of the washer, because the outer portions of the teeth would be engaged by the under surface of the nut and would prevent the projection 13 from following that portion of the screw-thread that is bent upwardly by the projections, and obviously unless these projections on the top surface of the washer engage only the thin tapered end of the screw-thread on the nut they cannot have the effect of distorting this screw-thread and produce the binding against the bolt. It will now be seen that after the nut is firmly screwed to position it will be locked to the bolt and prevented from turning. However, if the nut should be turned part of a revolution the resiliency of the metal of the washer would cause the washer to arch and still hold the projections 13 in engagement with the thin end of the screw-thread.

Having thus described my invention, what I claim as new, and desire to secure by Letters Patent of the United States, is—

1. An improved locking-washer comprising a circular disk made of spring metal with a round opening in its center and its body portion curved or arched in the form of a segment, ratchet-teeth on the lowermost parts of its under surface and projections on the uppermost parts of its upper surface, said projections being highest toward the center of the disk and tapering toward the circumference thereof.

2. An improved locking-washer made of spring metal of circular shape with a round opening in its center and with its body portion curved or arched in the form of a segment, ratchet-teeth on the lowermost parts of the under surface of the washer and two projections on the top surface of the washer at the highest points thereof, said projections being highest at a point in vertical alinement with the sides of the central opening and with their top edges tapering downwardly to the top surface of the washer at a point some distance from the periphery of the washer, for the purposes stated.

WILLARD J. COOK.

Witnesses:
J. RALPH ORWIG,
W. R. LANE.